US008456575B2

(12) United States Patent
Hill et al.

(10) Patent No.: US 8,456,575 B2
(45) Date of Patent: Jun. 4, 2013

(54) ONSCREEN REMOTE CONTROL PRESENTED BY AUDIO VIDEO DISPLAY DEVICE SUCH AS TV TO CONTROL SOURCE OF HDMI CONTENT

(75) Inventors: Seth Guy Hill, La Mesa, CA (US); Natalia Manea, San Diego, CA (US); Travis Baurmann, San Diego, CA (US); Abhishek Patil, San Diego, CA (US); Scott Szabo, San Diego, CA (US); Guru Prashanth Balasubramanian, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/238,390

(22) Filed: Sep. 21, 2011

(65) Prior Publication Data

US 2013/0070153 A1    Mar. 21, 2013

(51) Int. Cl.
*H04N 5/44* (2006.01)
*H04N 5/50* (2006.01)

(52) U.S. Cl.
USPC .......................................... 348/569; 348/734

(58) Field of Classification Search
USPC ....... 348/734, 569, 553; 725/37, 38; 345/173, 345/176; 340/12.22, 12.54, 13.2, 13.31; 455/420, 556.2
See application file for complete search history.

(56) References Cited

U.S. PATENT DOCUMENTS

| 6,407,779 | B1 | 6/2002 | Herz |
| 6,822,698 | B2 * | 11/2004 | Clapper ........................ 348/734 |
| RE39,059 | E * | 4/2006 | Foster ........................... 715/744 |
| 7,907,222 | B2 | 3/2011 | Haughawout et al. |
| 8,265,557 | B2 * | 9/2012 | Chung ........................ 455/41.2 |
| 2002/0118131 | A1 * | 8/2002 | Yates et al. .................... 341/176 |
| 2004/0066308 | A1 * | 4/2004 | Sampsell ................. 340/825.69 |
| 2007/0063862 | A1 | 3/2007 | Lippincott |
| 2008/0030483 | A1 * | 2/2008 | Choo et al. .................... 345/173 |
| 2008/0134237 | A1 | 6/2008 | Tu et al. |
| 2009/0125935 | A1 * | 5/2009 | Nishikawa et al. ............. 725/28 |
| 2009/0153289 | A1 * | 6/2009 | Hope et al. ..................... 340/5.1 |
| 2009/0233593 | A1 * | 9/2009 | Ergen et al. ................... 455/420 |
| 2009/0298535 | A1 * | 12/2009 | Klein et al. ................. 455/556.1 |
| 2010/0149130 | A1 * | 6/2010 | Jung et al. ..................... 345/174 |
| 2010/0315209 | A1 * | 12/2010 | Mickelsen .............. 340/310.11 |
| 2011/0060998 | A1 * | 3/2011 | Schwartz et al. ............. 715/738 |
| 2011/0099064 | A1 * | 4/2011 | Lyon et al. ................. 705/14.49 |
| 2012/0198488 | A1 * | 8/2012 | Son et al. ........................ 725/14 |

* cited by examiner

*Primary Examiner* — Victor Kostak
(74) *Attorney, Agent, or Firm* — John L. Rogitz

(57) ABSTRACT

An audio video display device (AVDD) includes a processor and a touch screen video display. The AVDD also includes a computer readable storage medium bearing instructions executable by the processor to present at least one image of a remote control (RC) on the display. Accordingly, responsive to a first user command, the processor presents an image of a full RC on the display. Responsive to a second user command, the processor presents an image of a direction-only RC on the display that permits a user only to enter direction commands and an "enter" command.

18 Claims, 4 Drawing Sheets

ONSCREEN REMOTE CONTROL PRESENTED BY AUDIO VIDEO DISPLAY DEVICE SUCH AS TV TO CONTROL SOURCE OF HDMI CONTENT

FIELD OF THE INVENTION

The present application relates generally to user interfaces (UI) for audio video display devices (AVDD) such as televisions (TVs).

BACKGROUND OF THE INVENTION

As understood herein, many televisions (TVs) and other audio video display devices (AVDDs) have touch screen displays. As also understood herein, TVs and other AVDDs often have component devices in communication with them, such as, but not limited to DVD players, set top boxes, speakers, printers, storage devices, etc. Present principles recognize that touch screen displays can be further utilized to manipulate a TV or AVDD and its associated, devices.

SUMMARY OF THE INVENTION

According to principles set forth below, an audio video display device (AVDD) includes a processor and a video display. The AVDD also includes a computer readable storage medium bearing instructions executable by the processor to present an image of a remote control (RC) on the display. Responsive to a first user command, the processor presents an image of a full RC on the display. Responsive to a second user command, the processor presents an image of a direction-only RC on the display that permits a user only to enter direction commands and an "enter" command. If desired, responsive to a third user command, the processor may also present an image of an iconified RC on the display permitting only selection of the iconified RC, the full RC, and the direction-only RC.

In non-limiting embodiments, the first and second user commands may be input by respective taps and/or touches anywhere on the display. Alternatively, the first and second user commands may be input by respective touches on respective first and second icons established by the image of the iconified. RC. However, it, is to be further understood that, if desired, the first and second user commands may be input both by respective touches on respective first and second icons established by the image of the iconified RC and by respective taps and/or touches anywhere on the display.

It is also to be understood that the image of the full RC may include, but need not necessarily include, each of the following command keys: a "play" RC command key, a "stop" RC command key, a "pause" RC command key, a "fast-forward" RC command key, a "rewind" RC command key, a "skip-to-beginning" RC command key, and a "skip-to-end" RC command key. The full RC may also include a "guide" RC command key, a "help" RC command key, a "menu" RC command key, an "info" RC command key, a "favorites" RC command key, a numerical grid of command keys including the numbers 1 through 9 and 0, a power on/off RC command key, a "channel up" RC command key, a "channel down" RC command key, a "volume up" RC command key, a "volume down" RC command key, an "enter" key, and a directional grid of command keys including an "up" key, "down" key, "left" key, and "right" key.

In some embodiments, the processor may also receive gesture commands independently of commands input using a RC presented on the display. Responsive to a determination that the image of a RC is being presented on the display, the processor interprets all touches on areas of the display presenting the image of the RC as RC input commands and disables interpretation of touches on areas of the display presenting the image of the RC as gesture commands.

Also in some embodiments, the image of the full RC may be presented responsive to a determination that the AVDD has established HDMI communication with a source of HDMI. Furthermore, the image of the full RC may be removed from the display after the elapse of a period during which no user input using the image is entered.

In another aspect, an audio video display device (AVDD) includes a processor and a video display. The AVDD also includes a computer readable storage medium bearing instructions executable by the processor to present at least first and second images of a remote control (RC) on the video display. The first image includes first RC command keys selectable by a user touching the display to enter RC commands to a component. The second image includes second RC command keys selectable by a user touching the display to enter RC commands to a component. It is to be understood that the first and second RC command keys may not be identical to each other.

In still another aspect, a method includes presenting at least one image of a remote control (RC) on a touch screen video display of an audio video display device (AVDD). The method also includes commanding a component connected to the AVDD based on input received using the at least one image of a RC.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
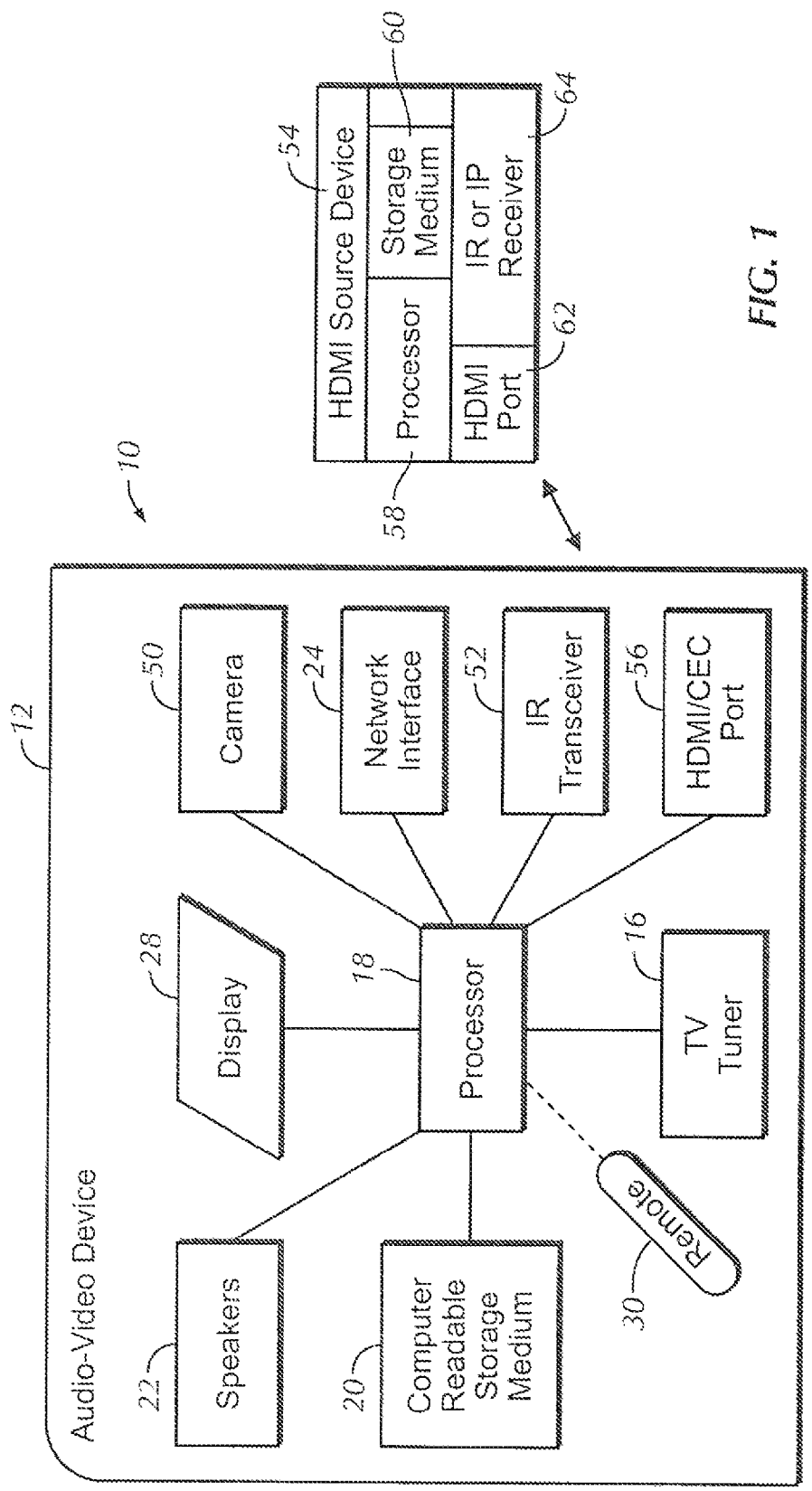
FIG. 1 is a block diagram of a non-limiting example system in accordance with present principles.

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless network interface 24 (such as a modem or router) communicating with the processor 12 which may execute a software-implemented browser. Video is presented under control of the TV processor 18 on a TV display 28 such as but not limited to a high, definition TV (HDTV) flat panel display, and may be a screen display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources as received by a terrestrial broadcast antenna which communicates with the AVDD 12 may be presented on the display 28 and speakers 22. The terrestrial broadcast programming may conform to digital ATSC standards and may carry within it a terrestrial broadcast electronic programming guide (EPG), although the terrestrial broadcast EPG may be received from alternate sources, e.g., the Internet via. Ethernet, or cable communication link, or satellite communication link.

TV programming from a cable TV head end may also be received at the TV for presentation of TV signals on the display 28 and speakers 22. When basic cable only is desired, the cable from the wall typically carries TV signals in QAM or NTSC format and is plugged directly into the "F-type connector" on the TV chassis in the United States of America, although the connector used for this purpose in other countries may vary. In contrast, when the user has an extended cable subscription for instance, the signals from the head end are typically sent through a STB which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source of TV broadcast signals received by an integrated receiver/decoder (IRD) associated with a home satellite dish may be input to the AVDD 12 for presentation on the display 28 and speakers 22. Also, streaming video may be received from the Internet for presentation on the display 28 and speakers 22. The streaming video may be received at the network interface 24 or it may be received at an in-home modem that is external to the AVDD 12 and conveyed to the AVDD 12 over a wired or wireless Ethernet link and received at an RJ45 or 802.11x antenna on the TV chassis.

Also, in some embodiments a video camera 50, which may be integrated in the chassis if desired or mounted separately and electrically connected thereto, may be connected to the processor 18 to provide to the processor 18 video images of viewers looking at the display 28. In some non-limiting embodiments, the processor 18 executes facial recognition using the video images received from the camera 50 to identify particular viewers. The processor 18 also stores images of viewers on the medium 20 in non-limiting embodiments, for future determination of whether a viewer is recognized when compared to stored images, or whether a recently received image relates to a new, or non-recognized, viewer. If desired, the processor 18 also creates and/or associates a profile with a user and/or stored images of the user and store the profile on the medium 20. A microphone may also be provided on the chassis or separate therefrom, and can be electrically connected to the processor 18 to provide viewer-generated voice commands to the processor 18.

The processor 18 may also communicate with an infrared (IR) or radiofrequency (RF) transceiver 52 for signaling to a source 54 of HDMI. The processor 18 may receive HDMI audio video signals and consumer electronics control (CEC) signals from the source 54 through an HDMI port 56. When the below-described soft remote control (RC) appears on the display 28 and is used by a person to enter commands, those commands can be sent to the source 54 through the HDMI/CEC link (using the port 56), or through the IR transceiver 52, or by Internet Protocol, through the network interface 24 (via the Internet or a local Ethernet). Thus, the source 54 may include a source processor 58 accessing a computer readable storage medium 60 and communicating signals with an HDMI port 62, and/or IR or IP transceiver 64. In any case, the below-described soft RC presented on the AVDD 12 need not know the particular type of source 54 of HDMI, and instead is agnostic as the type, since the AVDD already communicates with the source 54 over HDMI/CEC and thus has available necessary handshaking protocols to send RC commands input via the soft RC to the source 54.

Figure 6:
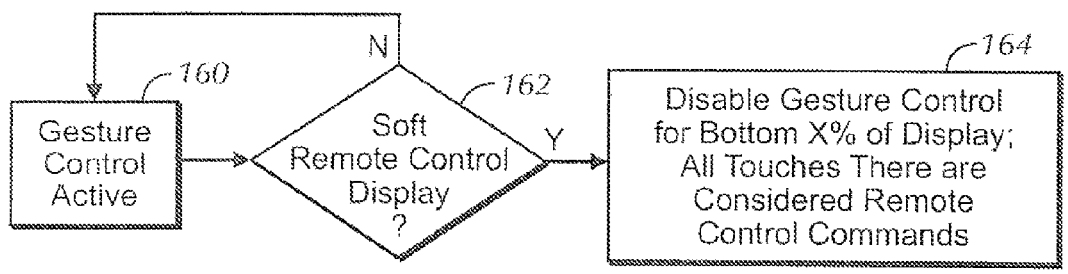
FIG. 6 is a flow chart of example logic for coordinating the onscreen RC functionality with gesture control functionality on the remainder of the touch display.

While present principles focus on the soft RC described below, present principles envision an alternate input mode in addition to the RC, namely, gesture command input. The gestures may be hand motion against the display 28 or may be hand motions made in free space and captured by the camera 50. FIG. 6, discussed further below, illustrates the provision for making simultaneously available both gesture control against the touch display 28 and by means of the soft RC. Non-limiting examples of gesture controls in terms of RC command counterparts are:

| RC COMMAND | GESTURE |
|---|---|
| Channel up | upward motion of hand |
| Channel down | downward motion of hand |
| Volume decrease | thumb down |
| Volume increase | thumb up |
| Fast Forward | swipe right |
| Reverse | swipe left |
| Record | spiral |
| Next chapter | two vertical swipes |
| Previous chapter | two swipes down |
| Stop | circle |
| Guide | two long touches on display |
| Menu | one long touch on display |
| Play/Pause (toggle) | double tap |

Figure 2:
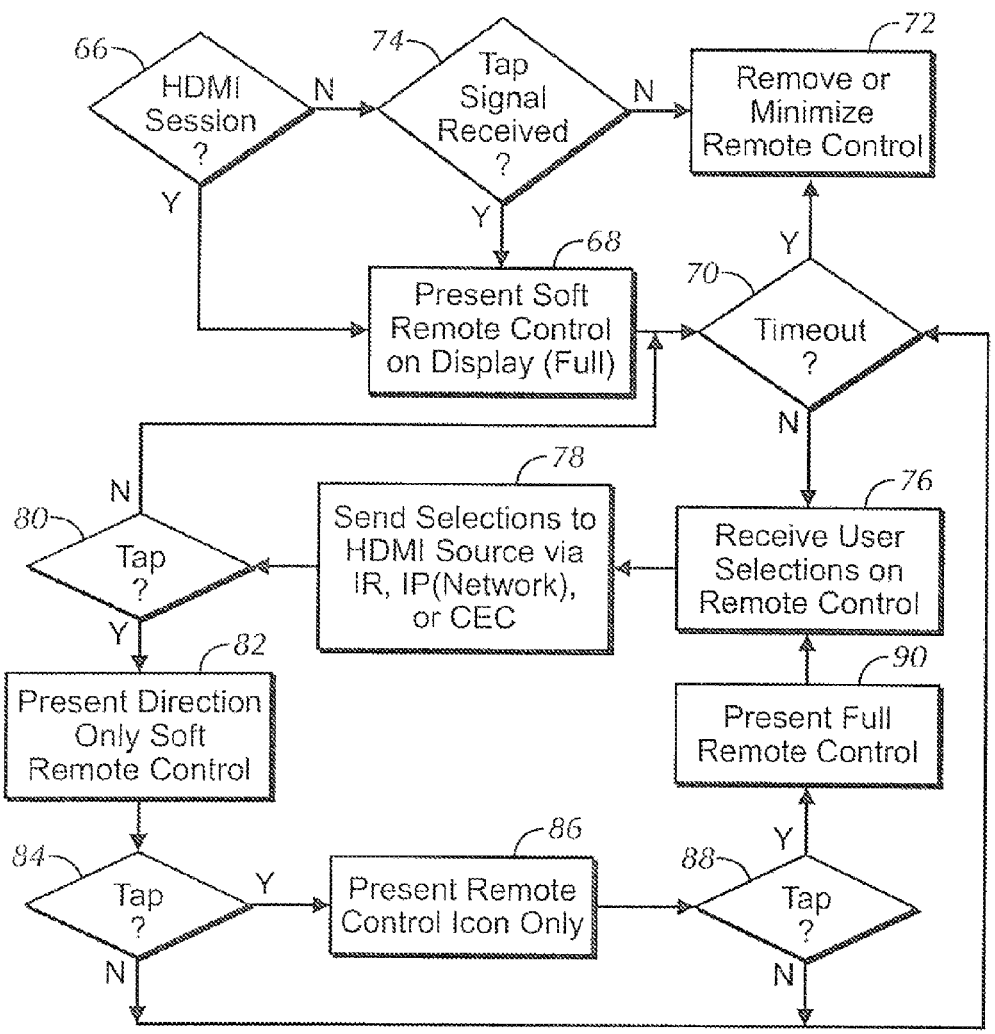
FIG. 2 is a flow chart of example logic in accordance with present principles.

Reference is now made to FIG. 2, which is a flow chart of example logic in accordance with present principles. Beginning FIG. 2 at decision diamond 66, the logic determines whether an AVDD, such as the AVDD 12 described above, has established HDMI communication with a source of HDMI in accordance with present principles. It is to be understood that HDMI communication between an AVDD and a source of HDMI is referred to herein as an HDMI session. It is also to be understood that a source of HDMI may include, but is not limited to, a device providing audio-video content to the AVDD 12 over an HDMI connection such as a set top box or high definition digital video disc player. It is to be even further understood that HDMI communication may occur through a wired or wireless connection. Note that while the present description refers the AVDD establishing HDMI communication with a source of HDMI, it is to be understood that present principles are not to be limited to HDMI, sessions and that present principles apply when the AVDD establishes communication not limited to HDMI communication with any non-limiting component(s), including consumer electronics devices such as, e.g., a standard digital video disc player (not communicating via HDMI), an audio stereo, and a personal computer (communicating over a USB connection).

If the logic determines at diamond 66 that an HDMI session has been established and/or initiated, the logic moves to block 68. At block 68, the logic presents an image of a full soft remote control (RC) on the display of the AVDD, though, it is to be understood that a partial RC or iconified RC may also by presented responsive to the determination made at diamond 66 in accordance with present principles, if desired. It is to be further understood that while the exemplary logic of FIG. 2 presents a full RC at block 68 responsive to the establishment and/or initiation of an HDMI session, present principles further recognize that a RC may be presented in other instances beyond the initiation and/or establishment of a an HDMI session, such as when a user inputs a touch anywhere on the display, as disclosed below.

Furthermore, note that a "soft RC", as referenced herein, is a user interface that is understood to include the image of a RC presented on the display of an AVDD. The soft RC presents images of particular RC command keys and/or icons on the display, where both the RC command keys and/or icons are selectable by a user touching the display to provide input to the AVDD and/or command the AVDD and any component device in communication therewith. Thus, e.g., touching a portion of the AVDD's display presenting an image of a particular RC command key of the soft RC causes execution of the command associated with the key on the component in communication with the AVDD, similar to execution of the same command responsive to selection of a key on a handheld remote control associated with the same command. Additionally, a "full" soft RC, as described herein, is understood to include more RC command keys than the direction-only RC, as also described herein, but need not necessarily include every command key shown in the exemplary embodiment shown in FIG. 3.

Still in reference to the logic of FIG. 2, after block 68 the logic moves to decision diamond 70. At diamond 70, the logic determines whether, a timeout has occurred. It is to be understood that a timeout is the elapse of a period during which no user input using the image of a RC is entered. If it is determined that a timeout has occurred at, diamond 70, the logic moves to block 72 where the logic removes or minimizes the soft RC. It is to be understood that, for purposes to be described below, at block 72 the logic may additionally not present the soft RC, though in the context of moving from diamond, 70 to block 72 the logic removes or minimizes a soft RC presented on the display.

Regardless, the logic moves from block 72 to decision diamond 74, where the logic determines if a tap signal has been received on the display of the AVDD. It is to be understood that the determinations regarding whether a tap has been received as disclosed in reference to FIG. 2 are based on whether a tap has been input anywhere on the display by, e.g., a user touching the display using the end of the user's index finger. A user may thus command the AVDD to present a RC on the display by inputting a tap in accordance with present principles.

If a tap signal is not received as determined at diamond 74, the logic reverts from diamond 74 back to block 72. As referenced above, at block 72 the logic does not present the soft. RC on the display of the AVDD (rather than the logic removing or minimizing the soft RC responsive to a determination that a timeout has occurred). Thus, as long as a tap signal is not received, the logic may continue to move between diamond 74 and block 72 as described above.

If, however, it is determined at diamond 74 that a tap signal has been received, the logic, proceeds back to block 68, where a full soft RC is again presented on the display. The logic may then proceed from block 68 to diamond 70, as described above. However, if at diamond 70 the logic determines that a timeout has not occurred, the logic then proceeds to block 76 rather than to block 72. At block 76 the logic receives user selection(s) of a key(s) on the soft RC. From block 76 the logic proceeds to block 78 where the user's selection(s) is sent to the source of HDMI via, e.g., infrared signals, a network connection, or a consumer electronics control (CEC) connection. After the selection(s) is sent, the logic moves to decision diamond 80. At diamond 80 the logic determines whether a tap signal in accordance with present principles has been received. If the logic determines a tap signal has not been received, the logic reverts from diamond 80 back to diamond 70, and then proceeds based on the determination to be made at diamond 70, as described above.

If, however, the logic determines a tap signal has been received at diamond 80, the logic proceeds to block 82. At block 82 the logic presents an image of a direction-only soft RC that permits a user only to enter direction commands and an "enter" command through the display. From block 82 the logic then proceeds to decision diamond 84. At diamond 84 the logic determines whether another tap has been received. If it is determined at diamond 84 that a tap has not been received, the logic reverts back to diamond 70 and then proceeds based on the determination to be made at diamond 70, as described above.

If, however, the logic determines a tap signal has been received at diamond 84, the logic proceeds to block 86. At block 86 the logic presents an image of an iconified RC on the display that permits selection of the iconified RC, the full RC, and/or the direction-only RC described herein. The logic then proceeds to decision diamond 88, where the logic determines whether another tap has been received. It is: to be understood that, in addition to receiving a tap anywhere on the display, the logic may also receive a touch on either the respective first icon or second icon established by the image of an iconified RC in accordance with present principles.

If it is determined at diamond 88 that a tap has not been received, the logic reverts back to diamond 70 and then proceeds based on the determination to be made at diamond 70, as described above. However, if the logic determines a tap signal has been received at diamond 88, the logic proceeds to block 90. At block 90 a full soft RC is presented on the display of the AVDD. However, it is to be understood that, in some embodiments, the tap received as determined at diamond 88 may instead cause a direction-only soft RC to be presented rather than the full RC if a user selected the iconified image of the direction only RC rather than the full RC.

From block 90 the logic may proceed back to block 76. However, it is to be understood that although not shown in the exemplary flow chart of FIG. 2, a determination as to whether a tap has been received in accordance with present principles may also occur after block 90. Accordingly, a determination, as to whether a timeout has occurred may also occur subsequent to that, rather than proceeding from block 90 back to block 76.

Figure 3:
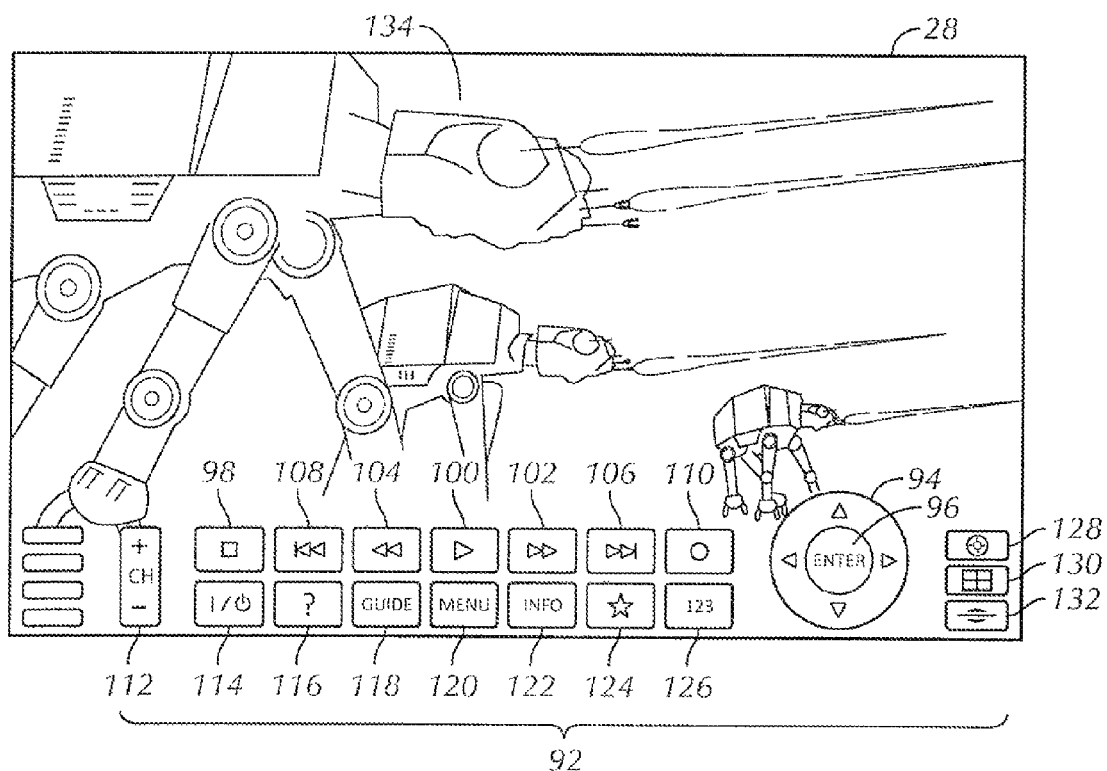
FIG. 3 is a screen shot of the full onscreen remote control (RC)

Now in reference to FIG. 3, an exemplary screen shot of an image of the full onscreen remote control (RC) is shown. Thus, the display 28 presents a full soft RC generally designated 92 on the bottom portion of the display 28, though it is to be understood that the RC 92 may be presented on any portion, of the display 28 and is therefore not necessarily limited to being presented on the bottom portion of the display 28. Furthermore, as may be appreciated from the screen shot shown in FIG. 3, an audio-video program 134 may be simultaneously presented on the display 28 while the RC 92 is presented. However, it is to be understood that other images, content, and/or interfaces may instead and/or also be simultaneously presented on the display 28 while presenting the RC 92, such as, but not limited to, a device options menu and/or a television program guide.

Still in reference to FIG. 3, the RC 92 also has a non-limiting direction grid 94 capable of manipulation by a user and includes a selectable "enter" key 96 in the middle of the grid 94. It is to be understood that the direction grid 94 allows a user to touch and/or manipulate the direction grid 94 to direct, e.g., a cursor or arrow presented on the display 18. The grid 94 may also be touched and/or manipulated to highlighting different portions of, e.g., a device options menu or television program guide for selection of the portion being highlighted. For example, the direction grid 94 may be manipulated to cause a cursor presented on the display 28 to move up, down, left, right, or diagonal across the display 28.

The RC 92 also has plural audio-video program control keys selectable by a user touching the display 18 to cause execution of their respective function on the AVDD 12 and/or an associated component, such as, but not limited to, a stop key 98, a play key 100, a fast-forward key 102, a rewind key 104, a skip-to-beginning key 106, a skip-to-end key 108, and a record program key 110. If desired, the full RC 92 may also include a channel up and down key 112 (though it is to be understood that a channel up key may be separate from a channel down key on the RC 92 in some embodiments), a AVDD power key 114, a help key 116, a guide key 118, a menu key 120, an info key 122, a favorites key 124, and a numerical, keypad key 126. It is to be understood that the numerical keypad key 126, if selected, may cause an image of a numerical grid of command keys including the numbers 1 through 9 and 0 to be presented on the display 28. Furthermore, though not shown in FIG. 3, a volume up key and a volume down key may also be presented on the full RC 92. As indicated above, all of the foregoing keys are understood to be selectable by a user touching the display 18 to cause execution of their respective function on the AVDD 12 and/or an associated component.

Thus, e.g., touching and/or tapping the play key 100 causes the AVDD to begin or resume presenting an audio video program being provided by a component in communication with the AVDD. It may be appreciated that entering RC commands by selecting RC command keys as referenced herein can therefore manipulate content and/or data from a component presented on the display 18. However, it is to be further understood that entering RC commands, such as the a volume up key (not shown), may cause manipulation of functions on the AVDD and/or component itself, and not just the content being presented thereon in accordance with present principles.

In addition to the foregoing, the exemplary RC 92 may also, include an icon 128 selectable to cause a direction-only RC to be presented, an icon 130 selectable to cause a full RC, such as the RC 92, to be presented, and an icon 132 selectable to cause only an iconified RC to be presented. Icons in accordance with present principles, such as the icon 128, 130, and 132 will be described further below.

Figure 4:
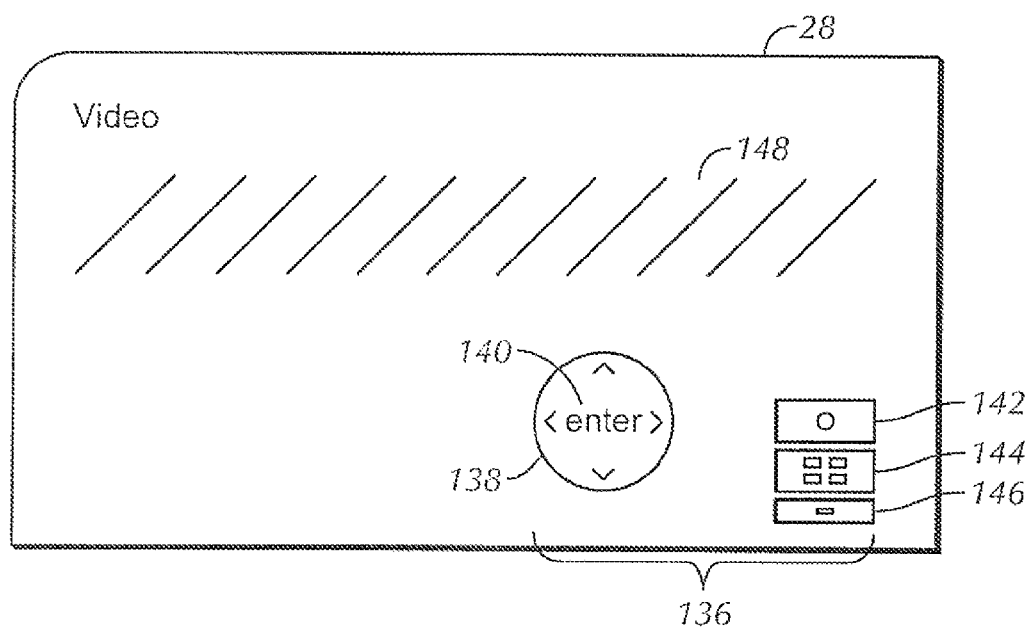
FIG. 4 is a screen shot of the partial (direction only) onscreen remote control (RC)

Now in reference to FIG. 4, a screen shot of an image of a partial onscreen remote control (RC) including a direction grid is shown. Thus, the display 28 includes a soft partial RC generally designated 136. The partial RC 136 includes a non-limiting direction grid 138 with a selectable "enter" key 140 in the middle of the grid 138. It is to be understood that the direction grid 138 may be touched and/or manipulated as described above in reference to the direction grid 94.

Additionally, the RC 136 of FIG. 4 has an icon 142 selectable to cause a direction-only RC to be presented, an icon 144 selectable to cause a full RC, such as the RC 92, to be presented, and an icon 146 selectable to cause only an iconified RC to be presented. However, it is to be understood that the partial RC 136 may not include the icon 142, icon 144, and icon 146, but may instead include only the direction grid 138. As referenced herein, a partial RC not including icons as presently described is referred to as a "direction-only" soft RC, and may only include a direction grid and an enter key, such as the grid 138.

Further, it may be appreciated that the RC 92 of FIG. 3 and the RC 136 of FIG. 4 are not identical to each other. As may also be appreciated from FIG. 4, an audio-video program 148 may be simultaneously presented on the display 28 while the RC 136 is presented. However, it is to be understood that other images, content, and/or interfaces may instead and/or also be simultaneously be presented on the display 28 while presenting the RC 136, such as, but not limited to, a device options menu and/or a television program guide.

Figure 5:
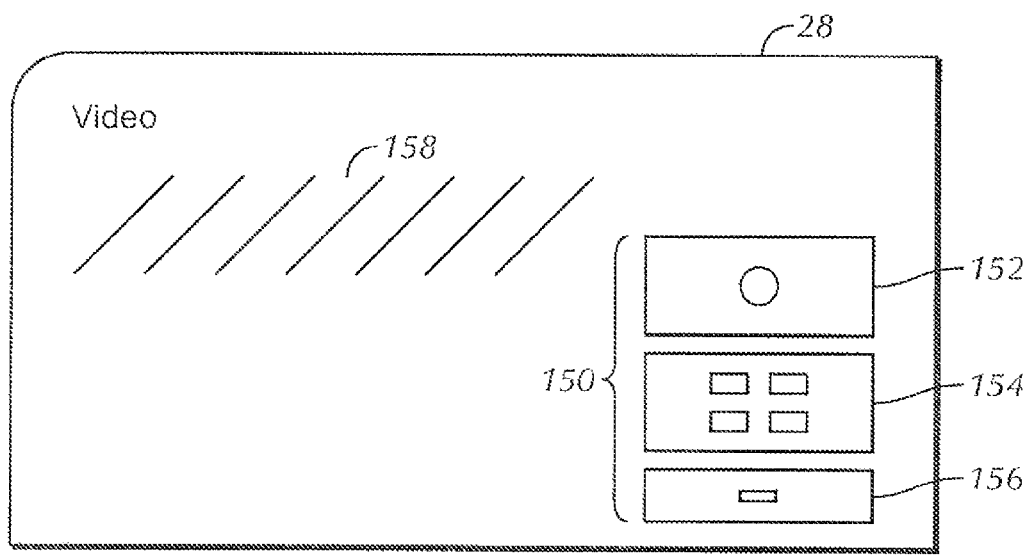
FIG. 5 is a screen shot of the iconified onscreen remote control (RC)

Moving on to FIG. 5, a screen shot of an image of an iconified onscreen remote control (RC) in accordance with present principles is shown. As shown in FIG. 5, the display 28 has a soft iconified RC generally designated 150. It is to be understood that, as used herein, an "iconified RC" is understood be a RC establishing icons representing at least one of the full RC 92, the partial RC 136, and/or iconified RC 150. The icons are selectable by a user touching the display of an AVDD to cause the respective RC associated with the icon to be presented on the display 18. Thus, the iconified. RC 150 as shown in the exemplary screen shot of FIG. 5 includes an icon 152 selectable to cause a direction-only RC to be presented. The RC 150 also has an icon 154 selectable to cause a full RC, such as the RC 92, to be presented, and further has an icon 156 selectable to cause only an iconified RC to be presented, such as the RC 150.

An audio-video program 158 may be simultaneously presented on the display 28 with the iconified RC 150. However, it is to be understood that other images, content, and/or interfaces may instead and/or also be simultaneously be presented on the display 28 while presenting the RC 150, such as, but not limited to, a device options menu and/or a television program guide.

Note that while the RC 92, RC 136, and RC 150 as described in reference to FIGS. 3-5 may be used to command the same component in communication with an AVDD in accordance with present principles, the RC 92, RC 136, and RC 150 may be used to command plural components. Further, in some embodiments, one of the RC 92, RC 136, and RC 150 may command a component that another of the RC 92, RC 136, and RC 150 may not command. Moreover, an AVDD in accordance with present principles may present plural full RCs, plural partial RCs, and/or plural iconified. RCs on its display, where those plural RCs may command different components in communication with the AVDD.

Now in reference to FIG. 6, a flow chart of example logic for coordinating the onscreen RC functionality with gesture control functionality on the remainder of the touch display is shown. Thus, beginning at block 160, gesture control in accordance with present principles is active such that gesture commands may be received to command a component and/or an AVDD independently of commands input using a soft RC presented on the display of the AVDD. Moving to decision diamond 162, the logic determines whether a soft RC is currently presented on the display of the AVDD. If the logic determines that a soft RC is not presented, the logic reverts back to block 160 where gesture control remains active, and gesture commands may be received by the AVDD to control the AVDD 12 and/or a component such as an HDMI device, if desired.

However, if the logic determines at diamond 162 that a soft RC is currently presented on the display of the AVDD, the logic moves to block 164 rather than reverting back to block 160. At block 164, the logic disables interpretation of touches as gesture commands for the bottom portion of the display presenting the soft RC. Thus, all taps and/or touches on the bottom portion of the display for which gesture control has been disabled are interpreted as RC input commands entered by touching and/or tapping and are not interpreted as gesture commands. For example, a user's physical movement toward the display of the AVDD to touch a portion of the soft RC that may otherwise be interpreted as a "channel up" gesture will not be interpreted as a gesture command. Note that while the soft RC as described in reference to FIG. 6 is understood to be on a bottom portion of the display of an AVDD, the soft RC may be presented on any area of the display, and that gesture control will be disabled for that area in accordance with present principles.

While the particular ONSCREEN REMOTE CONTROL PRESENTED BY AUDIO VIDEO DISPLAY DEVICE SUCH AS TV TO CONTROL SOURCE OF HDMI CONTENT is herein shown and described in detail, it is to be understood that the subject matter which is encompassed by the present invention is limited only by the claims.

What is claimed is:

1. An audio video display device (AVDD), comprising:
   a processor;
   a touch screen video display; and
   a computer readable storage medium bearing instructions executable by the processor to:
   present an image of a remote control (RC) on the display, the processor responsive to a first user command presenting an image of a full RC on the display, the processor responsive to a second user command presenting an image of a direction-only RC on the display which permits a user only to enter direction commands and an "enter" command.

2. The AVDD of claim 1, wherein the processor responsive to a third user command presents an image of an iconified RC on the display permitting only selection of the iconified RC, the full RC, and the direction-only RC.

3. The AVDD of claim 1, wherein the processor receives gesture commands independently of commands input using an RC presented on the display, and responsive to a determination that the image of an RC is being presented on the display, the processor interprets all touches on areas of the display presenting the image of the RC as RC input commands, disabling interpretation of touches on areas of the display presenting the image of the RC as gesture commands.

4. The AVDD of claim 1, wherein the image of the full RC is presented responsive to a determination that the AVDD has established HDMI communication with a source of HDMI.

5. The AVDD of claim 1, wherein the image of the full RC is removed from the display after the elapse of a period during which no user input using the image is entered.

6. The AVDD of claim 1, wherein the image of the full RC includes at least a play RC command key, a stop RC command key, a pause RC command key, a fast-forward RC command key, and a rewind RC command key.

7. The AVDD of claim 1, wherein the first and second user commands are input by respective taps anywhere on the display.

8. The AVDD of claim 2, wherein the first and second user commands are input by respective touches on respective first and second icons established by the image of the iconified RC.

9. The AVDD of claim 2, wherein the first and second user commands are input by respective touches on respective first and second icons established by the image of the iconified RC, and are also established by respective taps anywhere on the display.

10. An audio video display device (AVDD), comprising:
    a processor;
    a video display; and
    a computer readable storage medium bearing instructions executable by the processor to:
    present at least first and second images of a remote control (RC) on the video display, the first image including first RC command keys selectable by a user touching the display to enter RC commands to a component, the second image including second RC command keys selectable by a user touching the display to enter RC commands to a component, the first and second RC command keys not being identical to each other.

11. The AVDD of claim 10, wherein the processor further presents a third image of a RC on the display, the third image including icons selectable by a user touching the display of at least the first image and second image.

12. The AVDD of claim 11, wherein the processor presents the first or second image responsive to selection of the respective icon of the first or second image from the third image.

13. The AVDD of claim 11, wherein the processor presents the first or second image responsive to selection of the respective icon of the first or second image from the third image and/or by respective touches anywhere on the display not already presenting an image of a RC.

14. The AVDD of claim 10, wherein the first image includes RC command keys selectable by a user touching the display to enter RC commands to a first component and the second image includes RC command keys selectable by a user touching the display to enter RC commands to a second component.

15. The AVDD of claim 10, wherein the first and second images include RC command keys selectable by a user touching the display to enter RC commands to the same component.

16. The AVDD of claim 10, wherein the processor receives gesture commands to command the component independently of commands input using the image of an RC presented on the display, and responsive to a determination that the image of an RC is being presented on the display, the processor interprets all touches on areas of the display presenting the image of the RC as RC input commands, disabling interpretation of touches on areas of the display presenting the image of the RC as gesture commands.

17. The AVDD of claim 10, wherein the first, second, and/or third image of a RC is presented on the display responsive to a determination that the AVDD has established communication with a component.

18. The AVDD of claim 10, wherein the image of a RC is removed from the display after the elapse of a period during which no user input using the image is entered.

* * * * *